G. G. BARRY.
VEHICLE WHEEL.
APPLICATION FILED MAY 6, 1918.
1,432,048.
Patented Oct. 17, 1922.
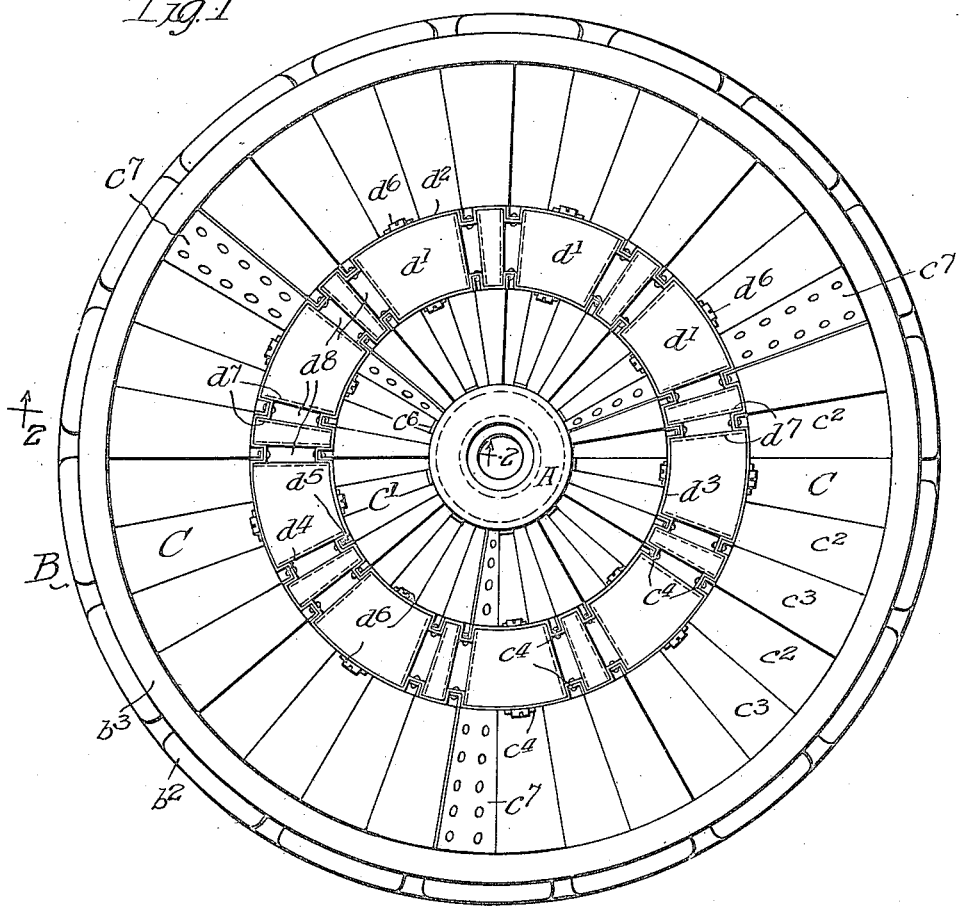
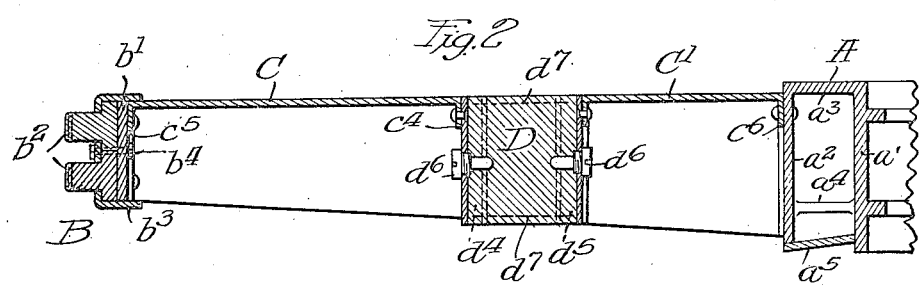

G. G. BARRY.
VEHICLE WHEEL.
APPLICATION FILED MAY 6, 1918.
1,432,048.
Patented Oct. 17, 1922.
2 SHEETS—SHEET 2.
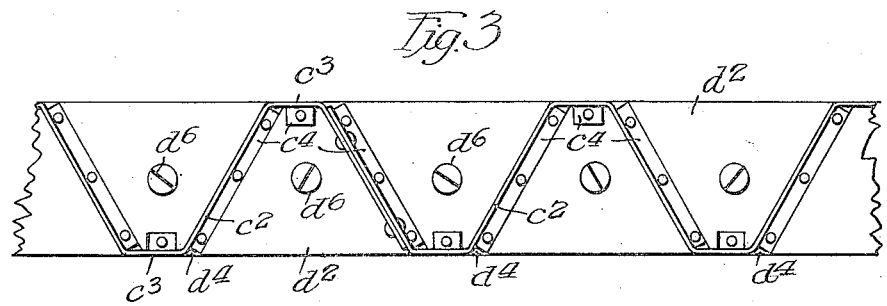
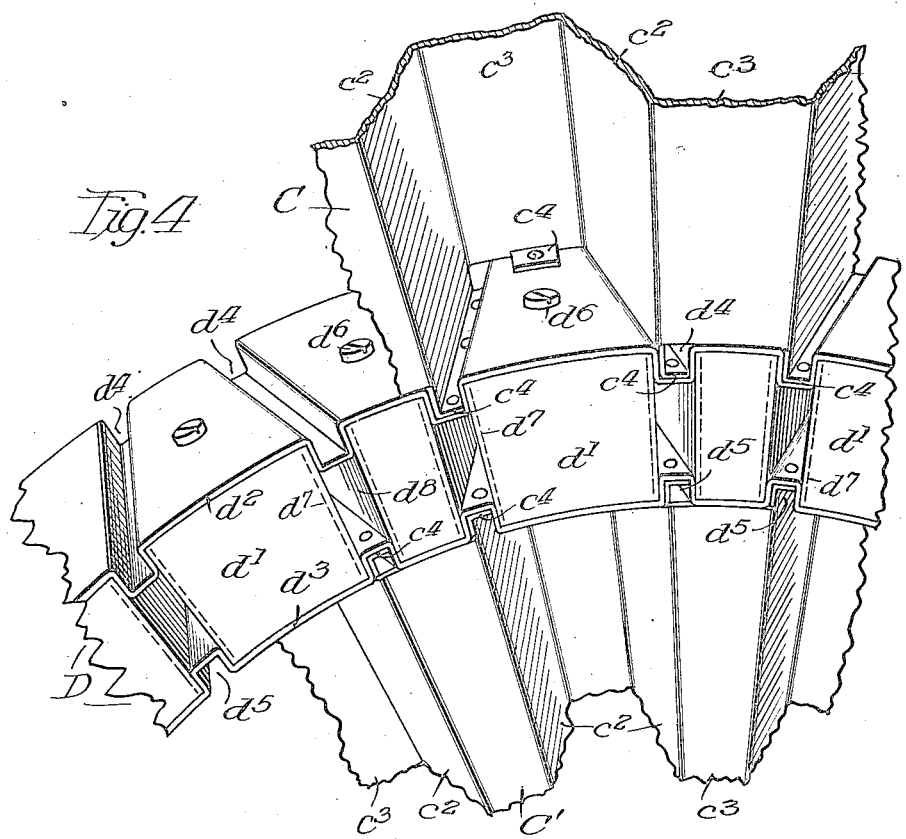

Patented Oct. 17, 1922.

1,432,048

UNITED STATES PATENT OFFICE.

GERALD G. BARRY, OF CHICAGO, ILLINOIS.

VEHICLE WHEEL.

Application filed May 6, 1918. Serial No. 232,962.

*To all whom it may concern:*

Be it known that I, GERALD G. BARRY, a citizen of the United States, and a resident of Chicago, in the county of Cook and State of Illinois, have invented certain new and useful Improvements in Vehicle Wheels, of which invention the following is a specification.

This invention is intended more particularly for use on automobile trucks but may, of course, be employed on other vehicles. It comprises a suitable hub and tire carrying rim, with improved form of supporting means, taking the place of the usual spokes, and also a supplemental and more resilient member for cushioning and absorbing the road shocks. The effect of the latter approaches more nearly the shock absorbing qualities of the pneumatic tire, without the disadvantages which accompany the use of the latter, of punctures and blow-outs, the yielding and resilience of the new member being superior to that which can be realized with the relatively more "solid" rubber it is necessary to employ in the road tire proper.

The features of improvement accomplished by my invention are hereinafter set forth, and their importance and value will be readily apparent to those familiar with the manufacture and use of such vehicle wheels.

In the description of my invention, reference is had to the accompanying drawings, forming a part of this specification, and in which similar letters and marks of reference are used to designate like parts throughout the several figures.

Fig. 1 is a full view of a complete wheel, showing various parts and details in their preferred assembled relation; Fig. 2 is a sectional view taken on the line 2—2 of Fig. 1; Fig. 3 is a plan view and Fig. 4 a more enlarged detail view, of certain parts, showing the way the sheet-metal supporting member is pressed and staggered so that portions of the single sheet of metal is progressively brought under opposite edges of the connected and supported element and joined or cross-connected from the same sheet, the cross-connection also extending all the way between and acting as part of the support; Fig. 4 also bringing out a little more clearly the details of the new cushioning element, which, instead of being out at the periphery, I prefer to locate intermediate the road rim and hub.

A is the hub member, B the usual outer road rim and tire carried thereon, C the new pressed sheet metal support member between the road rim and hub, which in this design is divided intermediate the rim and hub, and the cushioning element D and its detailed parts included in this annular space. The subdivided details of these main elements are indicated and will be referred to by lower case corresponding letters of the alphabet with distinguishing numerals, and will now be described.

The hub member A is preferably of cast metal, provided with the usual shaft housing $a'$ and means for holding the bearing parts in place and including some free grease space, but in addition in this design there is a secondary ring or outer hub rim $a^2$, with suitable connecting supports $a^3$ and $a^4$, $a^3$ being preferably closed while $a^4$ may be of spoked form or provided with openings to allow removal of the sand from the casting. For appearance, this outer side of the casting may be covered with a stamped sheet metal plate $a^5$. This central hub member is preferably cast in one piece, and the object of the outer hub rim $a^2$ is to provide more space to which to rivet or otherwise secure the flanges $c^6$ of the support member C' which would not be afforded by the small circumferential surface of the ordinary hub shaft housing $a'$.

The outer road rim and tire carried thereby, member B, may be of any suitable form. On the road rim $b'$ I have shown (Figs. 1 and 2) a tire of independent "solid" rubber sections $b^2$, which are detachably secured to the rim $b'$ by a steel spider frame $b^3$. This frame may be divided into segments and each portion bolted through the rim by centrally located bolts $b^4$, which can be drawn down very tight, ample space for thread and nut being afforded in this protected location. In drawing down the head the action is more direct and satisfactory than with the usual wedging from the side.

I now come to consider the elements C and D in which are embodied the more important new features of the invention and which enter into the combination as a whole.

The member C, the inner portion for distinction being marked C', is the new form of supporting means between the hub A and road rim member B, taking the place of the spokes in the ordinary wheel. Single flat discs have been employed by some manufacturers with advantages over wood, but with these there is some risk of distortion under road strains. Double parallel discs—some having a few outwardly pressed parts resembling spokes—give greater strength and reduce the risk of bending in a side thrust due, for example, to striking a street curbing. But with my form of structure a relatively thin, light weight, single thickness of steel or other metal affords great strength, including the withstanding of strains from side thrust, and other obvious advantages are realized.

As already noted, this specially formed sheet metal supporting member being here shown divided to provide an intermediate annular space for the new cushioning element D and its necessary details, I have for more general distinction marked the outer part portion C and the inner portion C'. These two pressed sheet metal structures are, however, essentially alike. I prefer to locate the element D in the intermediate annular space because the result is such that rubber can be saved, also it removes the rubber cushions from some of the wear due to dust, water, road greases, etc., and also because the additional rims $d^2$ $d^3$, between which the rubber sections of this element are positioned, also assist as reinforcing braces for the supporting sheets. In another application, embodying some special structural features as well, I will illustrate a wheel in which the resilient members supplemental to the road tire are located at the periphery of such a supporting member and not parted as in the design here shown.

This support member C C' is formed from sheet metal, a portion of same, as shown, being progressively brought under and secured to opposite sides or edges of the rims and hub, the portion of the sheet on the opposite sides being cross-connected from a continuing part of the same sheet of metal, the cross-connection being on an incline and marked $c^2$, and the two outer edges of the plate being on straight lines, marked $c^3$. The parallel side and cross-connection portion of the sheet extends the full length and all acts as part of the support. The ends of the sheet are bent to form flanges to be riveted or otherwise secured to the connected members,—$c^4$ marking the flanges set in the guide troughs $d^4$ of the member D, $c^5$ the flange at the outer road rim, and $c^6$ the flange secured to the hub rim $a^2$.

In the manufacturing operation of forming the supporting member from sheet metal, it may be preferred to divide the wheel area into about three segments. There is preferably one parting lap, as the member is not forged but is formed cold, and the fluting or forming die should have the sheet in a condition to be drawn upon or fed in to the die most easily and without much waste of metal. However, the blank may be in one piece provided with a large central opening to begin with, and the size of the opening shrinking with the forming operations. The formed member is progressively wider towards the center of the wheel than toward the rim. This taper not only serves to strengthen the structure against lateral strains but in shaping the blank compensation is afforded for the difference between the central and outer circumference. The segments may overlap at their adjoining cross parts $c^2$ and be riveted, welded or otherwise secured, as indicated at $c^7$ in Fig. 1.

The new cushioning element D remains to be considered. This is comprised of a plurality of rubber sections $d'$, located in the annular space between the two special rims $d^2$ and $d^3$, to which the supporting sheets are secured as before noted. The outer of said rims, $d^2$, is preferably formed with inwardly directed troughs $d^4$ on each side of the rubber sections or blocks $d'$, and the inner rim $d^3$ has troughs $d^5$ for the same purpose, that of guides and holders for the sections $d'$, the parts $d^4$ and $d^5$ being, with respect to their next adjoining corresponding part on their rims, inclined in opposite directions, as shown in Fig. 4. It will be obvious, however, that plain concentric bands may be employed for the rims $d^2$ and $d^3$ with separately secured strips or plates in place of the integrally formed guides $d^4$ and $d^5$. The rubber sections $d'$ being of the irregular shape shown, are inserted between the rims $d^2$ and $d^3$ from the widest side opening thus provided, which it will be noticed is alternately from opposite sides of the wheel. Same are held in this wedge-like position between the separating guides $d^4$ $d^5$ on each side thereof by screws $d^6$ threaded into the rim and having a smooth shank extending into an opening in the block $d'$. In Fig. 2 I have illustrated such a screw and shank extending into the blocks from both the inner and outer rims $d^2$ $d^3$, but one will suffice for each block, and it will preferably be located nearer the outer edge of the rim at the widest opening rather than centrally as the draftsman has here shown it. Other means may be employed to hold the blocks from backing out.

The rubber used in the tire $b^2$, because coming directly in contact with road obstructions, is preferably of the quite "solid" form, in order to stand the road usage and because the load is carried on the particular portion in contact. It is for the latter reason that soft yielding "fillers" are now employed in the make-shift efforts to avoid the effects of punctures to an ordinary pneumatic tire casing. With my form of structure, however, I can and I prefer to employ a relatively much more yielding and resilient rubber in the sections $d'$ than could be used in the solid road tire $b^2$. A little consideration will make apparent that while a road obstruction, for example, a brick, acts at the one point on the tire $b^2$, the stress of this when it comes to the supplemental cushioning element D is taken up and distributed via the rims $d^2$ $d^3$ to the plurality of sections $d'$ which practically coact together.

By reason of employing such a relatively more yielding and resilient rubber in the plurality of sections $d'$, I arrange to protect same around the outer exposed surfaces by a suitable covering or fabric skin, indicated in Figs. 2 and 4 by the dotted line marked $d^7$. The top and bottom faces of the blocks which are in contact with the rims will not need such covering.

The free space $d^8$ between adjoining blocks $d'$ furnishes ventilating ducts, the passage of air being facilitated under movement by the inclined direction of the openings $d^8$. These spaces $d^8$ also furnish necessary space into which the sides of the rubber blocks $d'$ yield under compression. The blocks $d'$ in being moulded are also preferably provided with other suitable yielding spaces or openings.

While for clearness of understanding I have given in the foregoing a rather detailed description of my invention, it will be obvious, however, that various changes may be made without departing from the spirit and scope of same. I do not wish any undue limitation to result from the selection I have made to illustrate the invention but I desire the claims appended hereto to be construed as broadly as possible in view of the prior art. For instance, the guides $d^4$ $d^5$, instead of being pressed from the rims $d^2$ $d^3$ may be formed of separate channel strips and riveted or otherwise secured to the rims. In the case of very heavy duty wheels, this would be preferable in manufacturing. It will also be apparent that the supplemental cushioning element D, instead of being located in the intermediate annular space here illustrated, may be located at the periphery of the supporting member C and the band carrying the road tire be secured to the rim $d^2$.

Having described my invention, what I claim as new and desire to secure by Letters Patent is:—

1. In a vehicle wheel the combination of a suitable hub member, a rim and solid rubber tire carried thereupon, supporting means between the hub and rim comprising a sheet metal structure constructed and secured substantially as herein set forth, and operatively connected intermediate the hub and felly members a cushioning element supplemental to the "solid" rubber road tire, said supplemental cushioning element comprising a pair of suitably secured flat rims arranged concentrically with the tire and separated to provide an annular space between the same, a plurality of rubber cushions in said annular space, said cushions being of more yielding and resilient rubber than that employed in the road tire, guides at the sides of each of said cushions secured to the supplemental rims and inclined transversely thereof, such inclination being alternately in opposite directions, the rubber cushions being wedged in the annular space separating the supplemental rims and between said oppositely inclined transverse guides, and means for each of said cushions for removably securing same in its wedged position, substantially as set forth.

2. In a vehicle wheel, the combination with a suitable hub member and road rim and support between the same, of a cushioning element comprising the pair of separated concentric rims $d^2$ and $d^3$ and means for securing same in the wheel structure, a plurality of independently removable resilient sections substantially of the shape herein shown circumferentially arranged in staggered relation with respect to each other in the annular space between said rims $d^2$ and $d^3$, guides $d^4$ and $d^5$, formed transversely in said rims $d^2$ and $d^3$ respectively, adjoining guides being inclined in opposite directions, and a screw $d^6$ to each block, having a shank extending part way through the block, for detachably securing each block in its wedged position, substantially as set forth.

3. In a vehicle wheel, the combination with a suitable hub and road rim tire carrying member, a sheet metal supporting structure between said hub and rim members, said sheet metal structure comprising two portions in the radial depth, with an annular space between the two portions, and a supplemental cushioning element in said annular space operatively secured and uniting the two portions of the sheet metal supporting structure, the said sheet metal supporting structure consisting of a circumferential series of radial corrugations of one thickness of sheet metal, the corrugations having flat bottoms flaring from the center outwardly, the said flat bottoms on one side of the wheel lying in a plane which is spread on an incline extending from the rim toward the center opposite to the other said series of bottoms, so as to provide a spacing between the respective flat bottoms on the two sides of the wheel which transversely is less toward the rim than at the center, the series of flat bottoms alternating on opposite sides of the wheel and being integrally united by a portion of the same sheet transversely inclined, this latter series of cross connecting portions also having flat surfaces but flaring from the rim toward the center and the transverse inclination from the plane of the wheels axis of this latter series of cross connecting portions being alternately in opposite directions.

4. In a vehicle wheel provided with a road tire, a supplemental cushioning element operatively included in the structure between the hub and road tire, said supplemental cushioning element comprising a pair of concentric rims separated to provide an annular space, a plurality of rubber blocks in said annular space, said blocks having tapered sides transversely of said rims, guides upon said rims at the tapered sides of said blocks transversely inclined to correspond with the taper of the blocks, and means for holding the blocks in such wedgelike position.

5. In a vehicle wheel, as a support included between the hub and rim members, a sheet metal structure consisting of a circumferential series of radial corrugations, the corrugations having flat bottoms which flare from the center outwardly, the said flat bottoms being spaced apart and alternating on opposite sides of the wheel and joined by a continuation of the same sheet, the said flat bottoms on one side of the wheel lying in a plane which is tapered on an incline extending from the rim toward the center opposite to the series of flat bottomed corrugations on the other side, so as to provide a spacing apart between the respective two series of bottoms which spreads wider toward the center than toward the rim, the series of flat bottomed outwardly flaring portions alternately located on opposite sides of the wheel being united by a continuing portion of the same sheet which is transversely inclined from the plane of the wheels axis, alternately in opposite directions, this latter series of cross connecting portions of the sheet metal also having flat surfaces, but flaring from the rim toward the center, substantially as set forth.

6. In a wheel of the character described, the combination of a hub provided with a shaft housing $a'$, a secondary band $a^2$, of larger diameter than said shaft housing and integrally connected therewith by a flange $a^3$, and a series of spokes also extending from the shaft housing $a'$ to the secondary band $a^2$, a sheet metal supporting structure, substantially of the character described, between the hub and rim members of the wheel, the central opening of which supporting structure is adapted to permit the said structure to be received upon and secured to the secondary band $a^2$, and a covering plate $a^5$, all substantially as and for the purposes set forth.

7. In a vehicle wheel of the character described, having a cushioning element comprised of a pair of concentric rims separated to provide an annular space and a plurality of independently removable rubber blocks of irregular shape in said space, the method of securing said rubber blocks in operative position consisting of transverse inclined guides on said rims between which the irregular shaped blocks are wedged in such annular space, and detachable means for holding the blocks in said position.

8. In a vehicle wheel of the character described, including a cushioning element circumferentially arranged in an annular space substantially as shown, said cushioning member comprised of a plurality of independently removable resilient sections and said sections when assembled being provided with spaces between the same for air circulation.

GERALD G. BARRY.